March 27, 1962　　　F. W. KAVANAGH　　　3,027,461
WIDE RANGE LINEAR TURBIDIMETER
Filed June 3, 1960

INVENTOR
FREDERICK W. KAVANAGH
BY Herbert A. Minturn
ATTORNEY

United States Patent Office 3,027,461
Patented Mar. 27, 1962

3,027,461
WIDE RANGE LINEAR TURBIDIMETER
Frederick W. Kavanagh, 231 Blue Ridge Road,
Indianapolis, Ind.
Filed June 3, 1960, Ser. No. 33,785
2 Claims. (Cl. 250—218)

This invention relates to a device for giving the measure of the number of particles which may be suspended in a fluid medium. The novelty of the inventive concept for giving a linear response lies in the use of the current output of a photocell limited to the effect of scattered light in relation to a beam of light passing through the fluid medium in terms of current outputs of a reference photocell and a photocell energized by a direct beam of light through the fluid medium.

This will become better understood in the following description of the invention. The primary purpose is to secure a linear relation between the concentration of particles in the fluid medium and instrument response. The relation heretofore in any of the known procedures has been, in relation to a graph of concentration against response to give a curve convex toward the concentration axis in one method, a curve concave toward the concentration axis in another method. Reference is made to the U.S. Brice Patent No. 2,064,517 wherein the method there is to measure the output of one photocell energized by a linear light beam through the fluid medium in terms of a fixed or reference photocell output. It is to be pointed out that this method gives a non-linear relation which is the opposite of the result sought by me.

A further important object of the invention is to provide an exceedingly simple and yet easily operated device for the purpose indicated.

Figure 1:
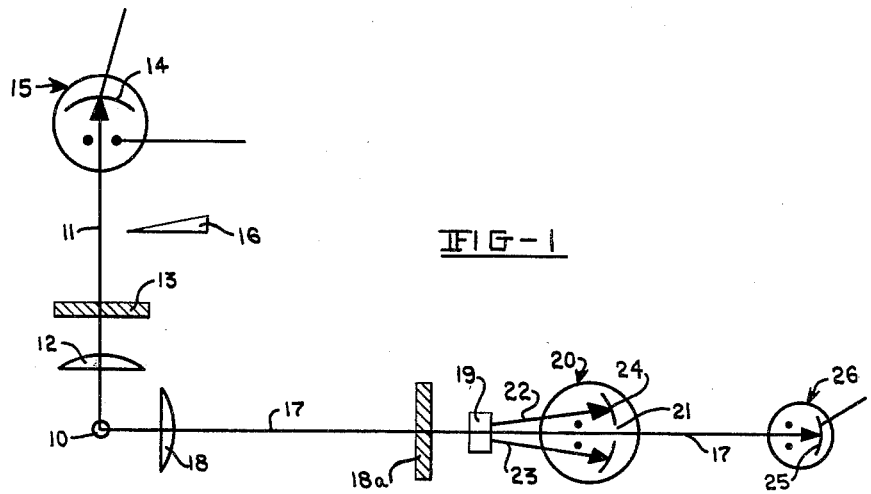
Figure 2:
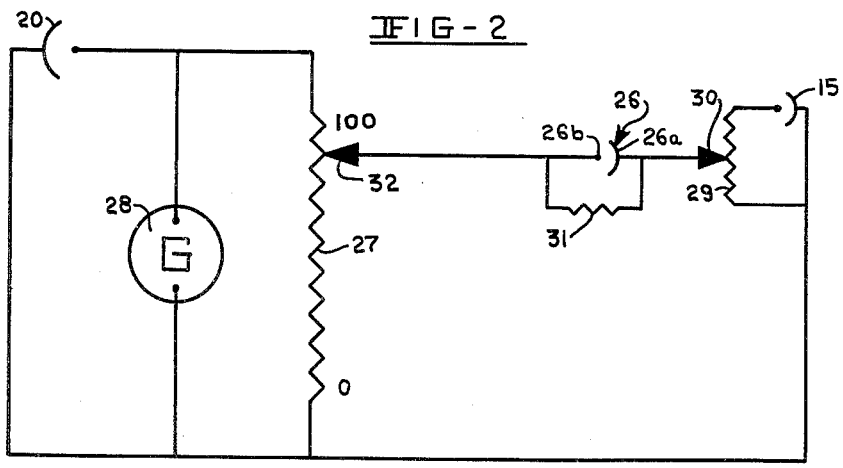

These and other objects and advantages of the invention will become apparent to those versed in the art in the following description of one particular form of my invention, in which FIG. 1 is a mechanical diagrammatic representation of the structure of the invention; and FIG. 2 is an electrical diagram of the device.

There is a fixed light source 10 consisting of a low voltage, concentrated filament, incandescent lamp. A beam of light indicated by the line 11 is directed through a lens 12 through a filter medium 13 to impinge upon the active surface 14 of a photocell 15. The amount of light reaching the surface 14 may be controlled by means of a gate 16 shiftable into and out of the beam 11 in desired degrees.

A second beam indicated by the line 17 is directed through a lens 18, a light filter 18a and through a cuvette 19 in which the fluid medium is placed, and the particles of the fluid therein are to be checked as to their number or concentration.

Particles suspended in the medium in the cuvette 19 will cause a scattering of the light beam from the straight line 17. Use is made of this scattered light. It may be caused to impinge in various manners, in part at least upon light activated surfaces, such as the surfaces in variously positioned photocells, where those surfaces may be angularly disposed or at right angles to the direction of travel of the rays of the scattered light, and not intercept the line 17 beam.

A simple way of employing this scattered light is as follows. A photocell designated by the numeral 20 is provided with an opening 21 through the active surface 24 to permit a beam in straight line continuation of the line 17 to pass on through that hole and beyond the photocell 20. However scattered light traveling along in proximity to the straight line 17 such as is indicated diagrammatically by the lines 22 and 23 will impinge on the active surface 24. The straight beam passing through the photocell 20 is directed onto an active surface 25 of the photocell 26.

The particles usually encountered in practice as being suspended in the fluid medium are so large relative to the measuring wave length of the light passing therethrough that the scattering of the light as deflected in the forward direction is much greater than it is at ninety degrees to the incident beam of light. Therefore while the invention is not limited to the forward scattering as indicated by the lines 22 and 23 in FIG. 1, the present device utilizes this forward scattering in preference to wider angles. As is indicated in reference to the photocell 20, the scattering of the light to each side of the straight line beam 17 is such that this scattered light is intercepted within the dimension of the active surface 24. Therefore with the cuvette 19 placed at a fixed distance from the surface 24 of the photocell 20, the intensity of light scattered at a given angle from the light beam 17 is a linear function of the concentration of suspended articles for dilute suspension in the fluid medium.

It is recognized that many practical measurements need to be made in the non-linear range of concentrations of suspended particles. However this invention is not limited to the measuring in the linear range. Computations particularly by means of computers, analogue and digital, are greatly simplified when the device used as in the present instance to measure the light scattered by the suspensions gives an output directly proportional to the concentration of these suspended particles.

In regard to the particular particles suspended in the fluid of the cuvette 19, they would be in the insoluble matter found in soluble pharmaceutical preparations, numbers of bacteria in an assay of certain vitamins and antibiotic substances, and also in the measurement of haze in purified sugar solutions, and the like. The measurement of such particles has many scientific and industrial applications over and beyond these given as examples.

Referring to the wiring diagram, FIG. 2, which is in simplified form, the photocell 20 is connected in parallel with the resistance of the potentiometer 27, and with the galvanometer 28.

The cathode and anode of the cell 15 have the fixed resistance of the potentiometer 29 in parallel with them, and the slider 30 of the potentiometer is in series with the cell 26. A fixed resistance 31 is in parallel with the cathode and anode of the cell 26.

Then the resultant outputs of the cells 15 and 26 are in series relation with the slider 52 of the potentiometer 27.

The scale of potentiometer 27 is provided with indicia which will range from any suitable low and high limits such as zero and one hundred, between which limits the slider 32 moves. This is common practice.

A fluid containing particles in suspension is selected, and this volume of fluid is divided into two portions, one portion being of the same concentration of particles as is the original volume, and the second portion is diluted, for example, to one-half concentration. In this manner, there is a sample of the fluid with the original concentration of particles in suspension and the second sample has but half of those particles in suspension.

Now sample No. 1 is employed and a part thereof is placed in the cuvette 19. With the light source 10 energized, the potentiometer 27 is adjusted by shifting the slider 32 along the resistance until the galvanometer reads zero on the scale thereof. Then the cuvette 19 is unloaded and a portion of the second sample (one-half concentration) is placed in the cuvette and the slider 32 is adjusted to give a second reading. The potentiometer 29 is adjusted until the second reading on the potentiometer 27 is one-half of the first reading for the first sample. As above indicated, the output of the cell 15 may be adjusted either by the potentiometer 29, or by the light gate 16. For the sake of explanation herein, the potentiometer 29 is referred to as the adjusting means.

Following the above indicated operations, the cuvette 19 is emptied and another portion of an unknown particle concentration in like fluid is placed therein, and the potentiometer 27 has its slide 32 shifted to give a reading in accordance with the activation of the cells 20 and 26. The potentiometer 29 is allowed to remain as originally set since that is the condition for linearity of response in subsequent measuring of concentration of particles in the fluid. It is to be observed that in shifting the slider 32 along the potentiometer 27, that shifting is carried on until the galvanometer reads zero in each instance.

Thus the invention may be employed to comparatively measure suspension of solid particles, suspension of bacteria, and rates of settling of particles in a fluid, and the like.

What has taken place in the device, electrically, is that the electrical output of the photocell 20 is measured in terms of the outputs of photocells 15 and 26 in the proper combination.

Therefore while I have herein shown and described my invention in the one particular form, it is obvious that structural changes may be employed, particularly in the wiring diagram, such for example as the introduction of amplifying means, without departing from the spirit of the invention, and I therefore do not desire to be limited to this precise form beyond the limitations which may be imposed by the following claims.

I claim:

1. A device for measuring numbers of particles suspended in a fluid medium which comprises a light source; a first photocell energized by a first beam of light from said source; a cuvette for holding a fluid sample containing said particles; a second photocell; a third photocell located to have a second beam of light from said source pass through said cuvette and impinge on the third photocell; said second cell being located to respond to light scattered by said particles in said cuvette; and circuit means including a current flow indicator, said second photocell, and a potentiometer, said first photocell, and said third photocell; said device through said circuit means combining the output of the third photocell with a portion of the output of said first photocell, wherein the combined output is a reference for measuring the scattered light output of the second photocell.

2. A structure for measuring the relative number of particles suspended in a fluid which comprises a source of light; a photocell receiving a beam of light from said source; means varying the output of current from said cell induced by said beam; a second beam of light from said source; a cuvette holding said fluid and passing said second beam therethrough, some of the light from said second beam being scattered by said particles and emergent from said cuvette in lines departing from the path of said second beam; a second photocell activated by said emergent scattered light; a third photocell located to receive said passed second beam; a current flow indicator; a potentiometer; and an electrical circuit including said second cell, said indicator, and said potentiometer; said potentiometer being adjustable to indicate a zero current flow in said circuit; and an additional circuit including said first cell output and said third cell connected to said first circuit, current output of said first and third cells being additive to said first circuit through said potentiometer giving a linear relation between the scale and concentration of suspended particles.

References Cited in the file of this patent

UNITED STATES PATENTS

| | | |
|---|---|---|
| 2,123,573 | McFarlan et al. | July 12, 1938 |
| 2,233,879 | Tolman | Mar. 4, 1941 |
| 2,761,067 | Troy | Aug. 28, 1956 |
| 2,806,148 | Barton | Sept. 10, 1957 |
| 2,856,811 | Kaye | Oct. 21, 1958 |
| 2,898,802 | Ljungberg et al. | Aug. 11, 1959 |